Dec. 18, 1962  E. W. ONULAK  3,068,993
CHAIN
Filed June 19, 1959
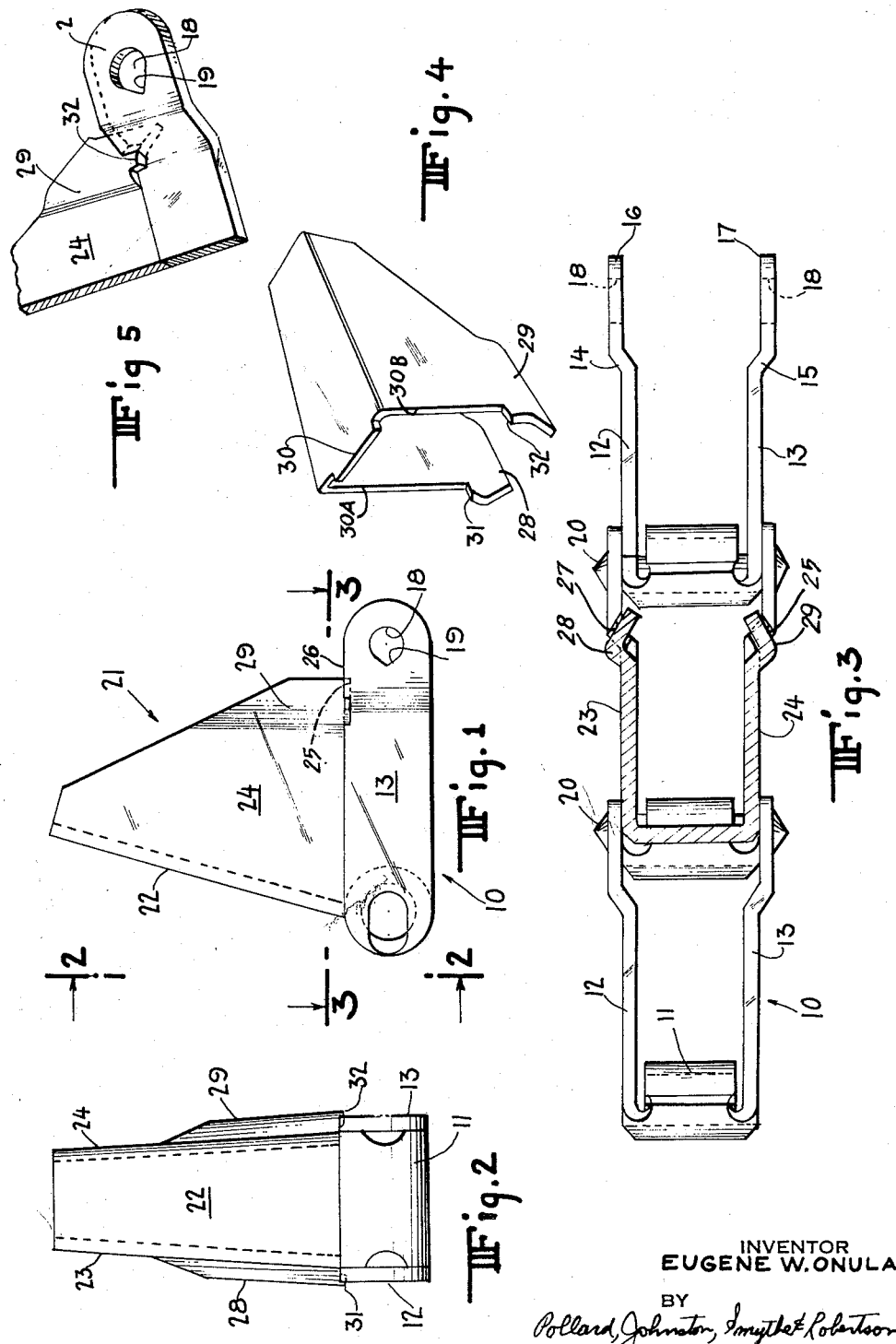
INVENTOR
EUGENE W. ONULAK
BY
Pollard, Johnston, Smythe & Robertson
ATTORNEYS

United States Patent Office 3,068,993
Patented Dec. 18, 1962

3,068,993
CHAIN
Eugene W. Onulak, Trumbull, Conn., assignor to The Locke Steel Chain Company, Huntington, Ind., a corporation of Connecticut
Filed June 19, 1959, Ser. No. 821,463
4 Claims. (Cl. 198—176)

This invention relates to a chain link and particularly to a chain link having an attachment member secured thereto in such a manner that the attachment member is mechanically interlocked with the chain link.

The invention is particularly adapted for use with chain links of the type similar to those shown in Patent No. 2,793,536. The conventional procedure for securing attachment members to chain links is to weld the member to both the legs and bushing portion of the links. Such a procedure has not proved satisfactory, since it is difficult to locate the attachment member with respect to the link and to maintain this position during the welding operations. In order to obtain adequate strength, numerous and extensive welds are required in mounting the attachment members to the links.

It is an object of this invention to provide a chain link and an attachment member to be secured thereto, which can be assembled in only one position relative to one another so as to establish their proper location and alignment.

It is a further object of this invention to provide a chain link having an attachment member secured thereto which is engaged with the link in order to locate the attachment member with respect to the link and to increase the strength of the junction.

In one aspect, the combination of the invention includes an integral U-shaped chain link and an attachment member mounted thereon, said attachment member and said chain link having key means to locate and to engage the attachment member with respect to the chain link.

According to a further aspect of the invention, the chain link has legs with an offset portion near their free ends. The attachment member and the offset portion are provided with key means to locate and to engage the attachment member to the chain link.

According to a further aspect of the invention, the attachment member and chain link are provided with key means to locate and join the parts which are fixed to each other by resistance welding.

The foregoing and other objects, features, and advantages hereof will become apparent from the following description and drawings which are merely exemplary.

In the drawings:

FIG. 1 is a side elevational view of the chain link and attachment member combination of the invention.

FIG. 2 is a front elevational view of the chain link and attachment member combination of the invention.

FIG. 3 is a plan view of a chain with the chain link and attachment member combination of the invention including a partial sectional view taken along the line 3—3 in FIG. 1.

FIG. 4 is a fragmentary perspective view of the disassembled and attachment member.

FIG. 5 is a fragmentary perspective view of the assembled chain link and attachment member.

The combination of the invention is particularly adapted for a chain made up of a number of links 10 (only three of which are shown in FIG. 3) of the type disclosed in the above mentioned Patent No. 2,793,536. Links 10 are formed from a blank and include a tubular bushing 11 and a pair of legs 12 and 13 which extend perpendicularly from bushing 11. Legs 12 and 13 extend substantially parallel to one another up to offset bends 14 and 15. End portions 16 and 17 are provided with aligned holes 18 at one side of which is located notch 19. The chain of links 10 is formed by positioning end portions 16 and 17 with respect to tubular bushing 11 of an adjacent identical link so that holes 18 of end portions 16 and 17 are aligned with the opening of tubular bushing 11 of the adjacent link. Hinge pin 20 is then inserted through the aligned parts and is headed so as to lock it with respect to links 10. The heading of hinge pin 20 engages them with notch 19 and precludes rotation of the pins.

The completed chain may be used in the operation of various forms of equipment such as conveying devices. In such applications it may be necessary to secure buckets or pusher bars to the chain. Attachment member 21 may serve to mount units such as buckets or pusher bars on the chain. Attachment member 21 may be formed from a channel section having end wall 22 and side walls 23 and 24. As shown in FIG. 2, side walls 23 and 24 bear directly upon legs 12 and 13.

As shown in FIGS. 1 and 3, offset bend 15 is provided with notch 25 extending across edge 26, and a similar notch 27 is provided on offset bend 14. Side walls 23 and 24 are formed with curved portions 28 and 29 respectively. Edge 30 (FIG. 4) of attachment member 21 is relieved at 30A, 30B so as to form steps 31 and 32 adjacent to curved portions 28 and 29 respectively.

The width of notches 25 and 27 corresponds to the thickness of curved portions 28 and 29. As shown in FIGS. 1 and 2, steps 31 and 32 are engaged into slots 25 and 27 respectively as attachment member 21 is positioned upon link 10. The mating action of the steps serves to conveniently locate attachment member 21 with respect to link 10 during assembly. Attachment member 21 is then fixed to link 10 by the combination of resistance welding and the keying effect of the two parts. When attachment member 21 is initially placed upon link 10, contact between the pieces occurs at steps 31 and 32 within their respective notches and along edge 30 adjacent to end wall 22. The radius of the tubular bushing 11 provides an initial contact of edge 30 along the top of the bushing during the application of the welding current. Attachment member 21 and link 10 are elevated in temperature at their contact points by the resistance welding operation and fused to one another. Attachment member 21 may be urged against link 10 during the application of the welding current to insure the firm seating of the main parts.

In the assembled form, the mating and keying action of steps 31 and 32 serves to increase the strength of the attachment over and above that of a mere welding attachment. The keying action of the steps with the notches increases the shear strength of attachment member 21 with respect to link 10. In addition, the welding of the locked steps and notches provides greater strength than would a simple butt weld at the same locations. The welded steps form a strong connection between the attachment member and chain link at a point that is best suited to resist the tensile force developed by the bending moment of loads that may be applied to attachment member 21 which may tend to separate it from chain link 10.

It is to be understood that the described exemplary embodiments are merely intended for the purpose of illustration and that the principles of the invention are not intended to be limited thereto except as defined in the appended claims.

What is claimed is:

1. The combination of a chain link and an attachment member wherein said chain link is of a substantially U-shape construction having a tubular bushing and a pair of spaced substantially parallel legs integral with said bushing, and said attachment member is of a substantially U-shape channel construction having substantially parallel side walls, said side walls overlying substantial portions of said legs, each of said side walls having key means extending in non-parallel directions relative to each other, and the corresponding link legs underlying each of said side walls having means cooperating with the corresponding key means of said side walls, whereby said key means will provide opposition to any applied lateral force so as to maintain said attachment in position upon said chain link.

2. The combination of a chain link and an attachment member wherein said chain link is of a substantially U-shape construction having a tubular bushing and a pair of spaced substantially parallel legs integral with said bushing, and said attachment member is of a substantially U-shape channel construction having substantially parallel side walls and a connecting wall at one end thereof, said side walls overlying substantial portions of said legs, said connecting wall having its bottom edge in abutment with said bushing, each of said side walls having key means extending in non-parallel directions relative to each other, and the corresponding link legs underlying each of said side walls having means cooperating with the corresponding key means of said side walls, whereby said key means will provide opposition to any applied lateral force so as to maintain said attachment in position upon said chain link.

3. The combination of a chain link and an attachment member wherein said chain link is of a substantially U-shape construction having a tubular bushing and a pair of spaced substantially parallel legs integral at one end thereof with said bushing, the other ends of said legs having outwardly directed offset portions, and said attachment member is of a substantially U-shape channel construction having substantially parallel side walls, said side walls overlying substantial portions of said legs, each of said side walls having key means extending in non-parallel directions relative to each other, and the corresponding link legs underlying each of said side walls having means adjacent said offset portions cooperating with the corresponding key means of said side walls, whereby said key means will provide opposition to any applied lateral force so as to maintain said attachment in position upon said chain link.

4. The combination of a chain link and an attachment member wherein said chain link is of a substantially U-shape construction having a tubular bushing and a pair of spaced substantially parallel legs integral at one end thereof with said bushing, the other ends of said legs having outwardly directed offset portions, and said attachment member is of a substantially U-shape channel construction having substantially parallel side walls, said side walls overlying substantial portions of said legs, each of said side walls having bottom tab projections extending in non-parallel directions relative to each other, and the corresponding link legs underlying each of said side walls having inwardly directed notch means formed on the top edge of each leg adjacent said offset portions with the corresponding bottom tab projections engaged in said notch means, whereby said projections and notch means will provide opposition to any applied lateral force so as to maintain said attachment in position upon said chain link.

References Cited in the file of this patent

UNITED STATES PATENTS

| | | |
|---|---|---|
| 1,638,267 | Morehead et al. | Aug. 9, 1927 |
| 2,276,978 | Hyman | Mar. 17, 1942 |
| 2,466,240 | Joa | Apr. 5, 1949 |
| 2,544,191 | Tomfohrde | Mar. 6, 1951 |
| 2,793,536 | Onulak | May 27, 1957 |